March 3, 1970 — J. C. WIDSTRAND — 3,499,097
STRAIN RELIEF FOR POWER CORD OF ELECTRICAL MACHINE
Filed Jan. 18, 1968
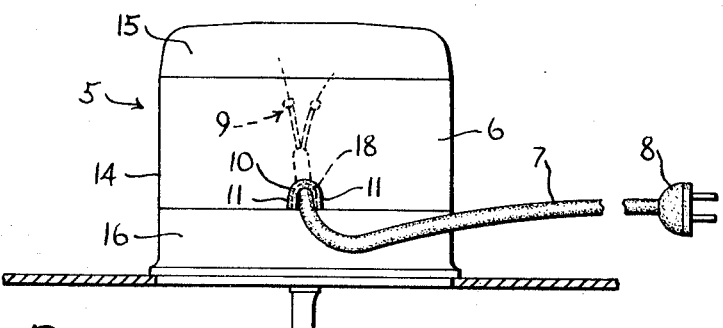
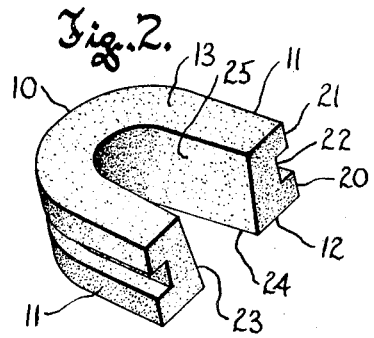
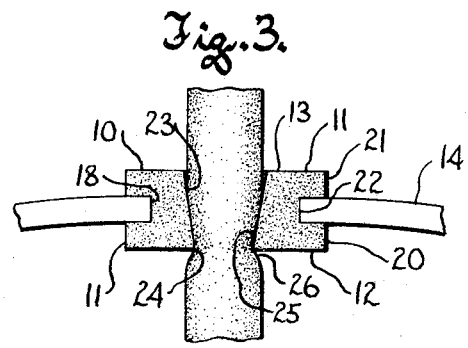
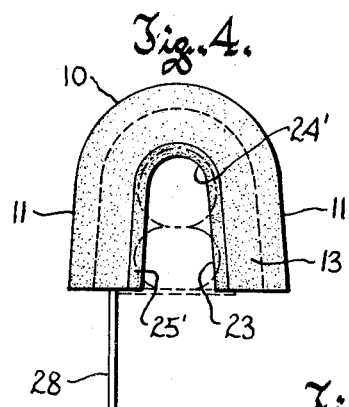
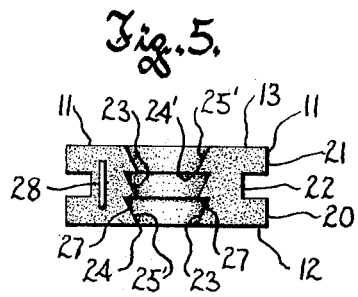
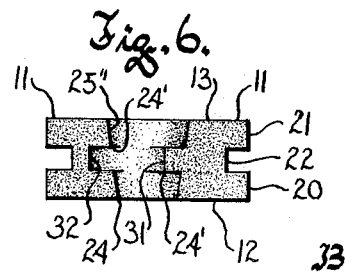
INVENTOR
John C. Widstrand
BY
ATTORNEY

United States Patent Office 3,499,097
Patented Mar. 3, 1970

3,499,097
STRAIN RELIEF FOR POWER CORD OF ELECTRICAL MACHINE
John C. Widstrand, Wausau, Wis., assignor to Marathon Electric Manufacturing Corporation, Wausau, Wis., a corporation of Wisconsin
Filed Jan. 18, 1968, Ser. No. 698,837
Int. Cl. H01b 17/26; H01r 13/58
U.S. Cl. 174—65                           4 Claims

ABSTRACT OF THE DISCLOSURE

A U-shaped bushing of plastic is interlocked with part of a housing of a motor or similar electrical machine and has its legs compressively straddling the power cord. The laterally inner surfaces of the legs are formed with sharp edged ridges that extend lengthwise along the legs and nonpenetratingly bite into the insulation sheath of the power cord to resist lengthwise movement thereof. In assembly the power cord is laterally forced into the gap between the bushing legs, thereby establishing the length of the internal power cord stretch.

---

This invention relates to strain reliefs for electrical machinery, and more particularly to means for preventing tension forces exerted upon the power cord of an electrical machine from being imposed upon the connections between the power cord and the internal conductors of the machine.

Many electrical machines such as fractional horsepower electric motors have a housing that encloses the windings and other internal conductors of the machine, and have a power cord that extends through the wall of the housing to conduct current to the internal conductors from a wall plug or other source. While the connections between the power cord and the internal conductors are made as sturdy as circumstances permit, the designer of an electrical machine must reckon with the likelihood that substantial pull forces will be imposed upon the power cord, and even that a relatively heavy motor or the like may be dragged or carried by its power cord. For this reason it is usual to provide a so-called strain relief that is intended to prevent pull forces on the external portion of the power cord from being imposed upon its internal connections.

The heretofore conventional expedient for providing strain relief has been to tie an overhand knot in the power cord at the interior of the housing, and to run the cord out through a hole in the housing that was big enough for the cord itself but not big enough to pass the knot. Usually a soft, resilient grommet was inserted into the hole to prevent chafing of the cord.

This prior strain relief expedient made necessary a very rigidly prescribed assembly sequence, whereby the installation of the grommet in the housing, the passage of the cord through the grommet, the tying of the knot in the cord, and the making of connections to the ends of the cord all had to be performed in a certain order. In many cases the inflexibility of this procedure was undesirable because of the peculiarities of the particular machine or the exigencies of the assembly line.

But even where a rigid assembly sequence caused no inconvenience, the prior strain relief arrangement had serious disadvantages. The insertion of the conventional grommet into the housing tended to be an awkward operation, requiring a degree of skill and dexterity that was inconsistent with the simple character of the grommet. The knotting of the power cord was time consuming, and could be fairly difficult when the power cord was stiff or thick. Knotting the cord was also wasteful and inefficient because of the difficulty in locating the knot at exactly the right point along the length of the cord so that there would be neither an excessively long loop of slack power cord inside the housing nor such a short internal stretch as to make it difficult to accomplish the internal connections. And unless the knot was drawn up tight, it could yield under tension on the cord to the point where pulling forces could be exerted upon the internal connections.

The general object of the present invention is to provide a strain relief expedient for electrical machines that avoids and overcomes all of the above discussed disadvantages of the heretofore conventional knotted cord strain relief, and which, more specifically, comprises a single very simple and inexpensive part that makes for quick and easy assembly without requiring special tools or special skills and eliminates certain of the operations required in production of the heretofore conventional strain relief, thereby affording substantial flexibility in assembly scheduling.

More specifically, it is an object of this invention to provide a strain relief bushing that can be readily slid into a notch that opens to one edge of a housing part for an electrical machine, and into which bushing a power cord is laterally insertable, said bushing being adapted to securely hold the power cord against lengthwise movement in response to outward pull forces thereon and also serving to prevent chafing of the power cord against its adjacent edges of the housing.

Another specific object of this invention is to provide a simple but effective strain relief arrangement for the power cord of an electrical machine, having as its principal element a simple bushing which can be readily molded of a plastic material such as nylon and which is at most only slightly more expensive than a conventional grommet but is much easier to install than a grommet, said bushing being adapted for lateral insertion of a power cord thereinto.

It is another object of this invention to provide in an electrical machine having a housing comprising two or more parts with contiguous edges, and a power cord which extends through the housing from its interior to its exterior, a strain relief for the power cord comprising a bushing which can be quickly and easily slid into a notch in an edge portion of one of the housing parts, and which makes possible a more flexible assembly sequence than has heretofore been available, avoids overlength and underlength stretches of power cord inside the housing, and generally reduces the time, effort and skill required for the assembly of the power cord with the housing and the connection of the cord with the internal conductors of the machine.

With these observations and objects in mind, the manner in which the invention achieves its purpose will be appreciated from the following description and accompanying drawings. This disclosure is intended merely to exemplify the invention. The invention is not limited to the particular structure disclosed, and changes can be made therein which lie within the scope of the appended claims without departing from the invention.

The drawings illustrate several complete examples of the physical embodiments of the invention constructed according to the best modes so far devised for the practical application of the principles thereof, and in which:

FIGURE 1 is a view in side elevation of an electric motor equipped with a strain relief for its power cord that embodies the principles of this invention;

FIGURE 2 is a perspective view of a strain relief bushing of the invention;

FIGURE 3 is an end view of the strain relief bushing illustrated in FIGURE 2, shown in assembled relation to a housing part in which it is installed and a power cord with which it cooperates;

FIGURE 4 is a plan view of a modified embodiment of the strain relief bushing of this invention;

FIGURE 5 is an end view of the strain relief bushing shown in FIGURE 4; and

FIGURE 6 is an end view of another modified embodiment of the strain relief bushing.

Referring now to the accompanying drawings, the numeral 5 designates generally a fractional horsepower electric motor which embodies the principles of this invention and which will be understood as typifying the many kinds of electrical machines to which the invention is applicable. As is conventional, the motor 5 has a housing 6 that encloses fixed and rotating parts comprising windings (not shown) to which electric current is brought by means of an insulation-sheathed power cord 7 that extends through the housing. At its outer end the power cord can have a conventional male plug 8, while at its inner end it has suitable connections 9 with the internal motor circuitry.

As in all such machines, it is important to prevent any outward pull on the power cord from being transmitted to the stretch of the power cord that is inside the housing, mainly to prevent breakage of the internal power cord connections 9, which may comprise soldered splices between the power cord leads and the relatively thin wire of the stator windings. To this end there is fixed in the housing 6 a substantially U-shaped strain relief bushing 10 of this invention, which has an interlocking connection with the housing and which has its legs 11 compressively straddling the power cord and formed to prevent lengthwise movement thereof, all as explained in detail hereinafter.

The strain relief bushing 10 is made of a relatively rigid but non-brittle material, preferably one having good insulating properties. It can be readily molded of nylon or the like, and it presents no unusual molding problems because it can have substantially flat inner and outer faces 12 and 13 and because its legs 11 preferably diverge somewhat towards their free ends.

Particular attention is directed to the simple manner in which the strain relief bushing 10 is secured in the housing 6. As is conventional, the housing is made in several parts, comprising, in the present case, a cylindrical intermediate housing member or frame 14 and a pair of end bells 15 and 16. One edge of the intermediate housing member 14 has a notch 18 therein in which the U-shaped strain relief bushing 10 is received with its bight portion in the bottom of the notch and the tips of its legs 11 about even with the mouth of the notch. Radially outwardly projecting inner and outer flanges 20 and 21 on the bushing define an outwardly opening groove or rabbet 22 that has a width substantially equal to the thickness of the wall of the housing member 14, and these flanges respectively overlie the inner and outer surfaces of said housing member around the edge of the notch 18 to prevent in and out displacement of the bushing relative to the housing.

It will be apparent that the bushing 10 is assembled with the housing member 14 by merely sliding the bushing into the notch 18, and that when the end bell 15 is secured to the intermediate housing member 14 it locks the bushing in place.

It will also be apparent that the notch 18 could equally well be formed in the edge of one of the end bells or in any other convenient edge on a housing part so long as such edge is adapted to be contiguous to an edge or surface on another housing part that will confine the bushing in the notch.

To hold the power cord against lengthwise movement, each of the legs 13 of the U-shaped bushing must have its laterally inner side so formed as to provide a ridge 23 having a sharp edge 24 that extends lengthwise along the leg, and having one of the surfaces which define said edge facing inwardly of the bushing, the distance between the edges 24 on the two legs being less than the thickness of a power cord with which the bushing is intended to cooperate, so that when the power cord is forced laterally into the gap between the legs, the ridges nonpenetratingly bite into its insulating sheath and so deform the sheath as to cooperate therewith in resisting outward lengthwise movement of the power cord.

In the embodiment of the invention illustrated in FIGURES 2 and 3, the laterally inner side of each leg of the bushing has its surface 25 oblique to the inner and outer faces 12 and 13 of the bushing, and the two surfaces 25 converge toward the inner face 12 to cooperate therewith in defining a sharp inner edge 24 on each leg. Because of the inward convergence of the surfaces 25, they define ridges 23 along the legs at the inner face 12 of the bushing, where the gap between the legs is narrowest, and in this case the inwardly facing surface that defines each edge 24 is of course the inner face 12 of the bushing.

When a power cord is forced between the legs of the bushing, the ridges 23 compressively deform its insulating sheath to produce outwardly facing shoulders 26 on the power cord that opposingly engage the inner face 12 of the bushing and thus resist outward pulling forces on the cord. It will be seen that the force required to wedge the power cord between the ridges 23 is mainly spent in effecting such deformation of the insulating sheath, very little of it being used in overcoming friction between the cord and the bushing. The divergence of the legs of the bushing toward their free ends facilitates wedging insertion of a power cord into the gap between them.

In the embodiment of the invention illustrated in FIGURES 4 and 5, the laterally inner side of each leg of the bushing is formed with a more or less saw-tooth profile as seen from the end of the leg, with a series of parallel ridges 23 extending along the leg. Each ridge has a narrow surface 25' that is oblique to the inner and outer bushing faces and a narrow surface 27 that faces inwardly of the bushing, and said surfaces 25' and 27, at their junction, define a substantially sharp edge 24' that extends lengthwise along the leg. There are thus a plurality of sharp edges 24' extending along the laterally inner side of each leg, each such edge on one leg having its opposite counterpart on the other, and the several pairs of opposite edges on the bushing all bite into the insulation sheath on a power cord wedged between the legs to deform its insulating sheath as described above and thus hold it against lengthwise outward movement.

As illustrated in FIGURES 4 and 5, the bushing can be molded with an integral tab or finger 28 that projects endwise from the tip of one leg, near the laterally inner side thereof, and is adapted to be bent toward the other leg after a power cord is inserted into the gap between the legs. When so bent, the finger 28 serves as an insulating guard that prevents any possibility of a short circuit between the power cord conductors and the edge of the end bell 15 adjacent to the bushing. While desirable, the tab or finger 28 is by no means essential, since the wedging confinement of the power cord between the legs of the bushing of this invention tends to prevent lateral displacement of the power cord in the direction toward the tips of the legs; and even if such displacement occurred, the insulation sheath is not likely to be abraded by its engagement with the unguarded end bell edge because it is confined against lengthwise motion relative to that edge.

The embodiment of the invention illustrated in FIGURE 6 is generally similar to that shown in FIGURES 2 and 3, in that the laterally inner sides of the legs of the bushing have surfaces 25" which converge towards the inner face 12 of the bushing, but in this case one of said surfaces is interrupted by a tongue or land 31 that projects laterally into the gap between the legs and extends lengthwise along its leg, while the surface 25" on the other leg is interrupted by a groove 32 which is opposite the tongue. Both the tongue and the groove have square corners that define sharp edges 24' which extend lengthwise along the legs and supplement the sharp edges 24 that extend along the legs at the inner face of the bushing. The tongue and groove cooperate to form a small but relatively abrupt kink or jog in the part of a power cord confined between them, whereby their sharp edges 24' are rendered very effective to bite into the power cord insulation and prevent lengthwise motion of the power cord.

It will be apparent that on a bushing having the tongue and groove arrangement just described, the surface portions 25" on the laterally inner sides of the legs could be normal to the inner and outer faces of the bushing instead of being oblique to them as shown.

In assembling the strain relief of this invention, the bushing is slid into its notch in the intermediate housing member 14, and the power cord is merely forced laterally between the legs of the bushing. Because the cord is inserted laterally into the bushing, it is very easy to control the length of the stretch of cord that will be inside the housing, and the cord can be assembled into the bushing either before or after the internal connections have been made and regardless of whether or not a plug has been attached to the outer end of the cord. Furthermore, the power cord can be forced into the bushing either before or after the bushing is inserted into its notch in the housing part that receives it.

From the foregoing description taken with the accompanying drawings it will be apparent that this invention provides a very simple and inexpensive but highly effective strain relief for the power cord of an electrical machine, requiring substantially less time and skill for its assembly than prior strain reliefs and affording the utmost flexibility in procedures for its assembly.

What is claimed as my invention is:

1. An electrical machine having a housing that comprises a pair of parts with contiguous edges, and having an insulation sheathed power cord that extends through the housing from its interior to its exterior, said electrical machine being characterized by:
   (A) one of said housing parts having a notch through which the power cord extends and which opens to the edge of said part contiguous to the other part, the widest portion of said notch being at said edge;
   (B) a substantially U-shaped bushing a harder material than the insulation sheath, straddling the power cord and received in said notch with its legs projecting toward said edge and terminating substantially in line therewith so that the bushing is held in the notch by said edge of the other part, said bushing
      (1) having opposing flanges overlying opposite surfaces of said housing part around the notch, to hold the bushing in the housing part,
      (2) having the space between its legs widest at their free ends and inwardly convergent toward its bight portion so as to compressively squeeze the power cord as the same is inserted laterally between the legs, and
      (3) having the opposing inner surfaces of its legs formed with sharp-edged ridges that extend lengthwise along the legs and between which the power cord is confined under a compression that deforms its insulation sheath to provide opposite shoulders thereon which opposingly engage the ridges and thus prevent lengthwise motion of the power cord relative to the bushing.

2. Strain relief means for a power cord of an electrical machine characterized by:
   a substantially U-shaped bushing of substantially rigid material having inner and outer faces, said bushing
      (1) having its greatest external width across the free ends of its legs, to be receivable in a notch in an edge portion of a housing part for an electrical machine upon bight-foremost motion into the notch lengthwise of its legs,
      (2) having opposing inner and outer external flanges adapted to overlie opposite faces of the housing part around the notch, to interlock the bushing with the housing part, and
      (3) the legs of the bushing being farthest apart at their free ends and having opposing surface portions which define a gap between them that varies in width from the outer face to the inner face to provide ridges in the gap that have substantially sharp edges extending along the legs at opposite sides of the gap, said edges being spaced apart by a distance less than the thickness of a power cord forced between them so that the ridges nonpenetratingly bite into the insulation sheath of the power cord to resist lengthwise outward displacement of the same.

3. The strain relief means of claim 2, molded of relatively rigid but non-brittle plastic material, further characterized by:
   an integral tab projecting endwise from one of the legs of the bushing and bendable to a position extending toward the other leg so as to lie along an edge of another housing part and prevent contact therewith by a power cord confined between the legs of the bushing.

4. The strain relief means of claim 2, further characterized by:
   said sharp-edged ridges in the gap between the legs being defined by a tongue on one leg which projects laterally into the gap and extends along the leg and a groove in the other leg, opening to the gap and opposite the tongue.

References Cited

UNITED STATES PATENTS

| 2,913,740 | 11/1959 | Eldrige | 5—317 |
| 3,290,430 | 12/1966 | Klumpp et al. | |
| 3,123,662 | 3/1964 | Fink | 174—65 |
| 2,420,826 | 5/1947 | Irrgang | 339—103 |

FOREIGN PATENTS

| 410,099 | 10/1966 | Switzerland. |
| 201,688 | 1/1959 | Austria. |

OTHER REFERENCES

IBM Technical Disclosure, vol. 1, No. 5, February 1959, p. 35, Cable Grommet.

LARAMIE E. ASKIN, Primary Examiner

A. T. GRIMLEY, Assistant Examiner

U.S. Cl. X.R.

174—135, 153